US007938584B2

(12) United States Patent
Felis et al.

(10) Patent No.: US 7,938,584 B2
(45) Date of Patent: *May 10, 2011

(54) CAGE FOR INCLINED BALL BEARING

(75) Inventors: Norbert Felis, Schweinfurt (DE);
Alexander Haepp, Lendershausen (DE)

(73) Assignee: Schaeffler KG, Herzogenaurach (DE)

( * ) Notice: Subject to any disclaimer, the term of this patent is extended or adjusted under 35 U.S.C. 154(b) by 859 days.

This patent is subject to a terminal disclaimer.

(21) Appl. No.: 10/599,079

(22) PCT Filed: Mar. 18, 2005

(86) PCT No.: PCT/DE2005/000504
§ 371 (c)(1),
(2), (4) Date: Oct. 20, 2006

(87) PCT Pub. No.: WO2005/090809
PCT Pub. Date: Sep. 29, 2005

(65) Prior Publication Data
US 2007/0206893 A1 Sep. 6, 2007

(30) Foreign Application Priority Data
Mar. 20, 2004 (DE) .......................... 10 2004 013 802

(51) Int. Cl.
*F16C 33/38* (2006.01)
(52) U.S. Cl. .................. 384/523; 384/528; 384/534
(58) Field of Classification Search .................. 384/523, 384/526, 527, 531, 533, 534, 528
See application file for complete search history.

(56) References Cited

U.S. PATENT DOCUMENTS

| 3,975,066 A * | 8/1976 | Hofmann et al. ............. 384/526 |
| 4,723,851 A * | 2/1988 | Troster et al. ................. 384/523 |
| 7,524,116 B2 * | 4/2009 | Haepp ........................... 384/523 |
| 2001/0036329 A1 | 11/2001 | Chambert | |

FOREIGN PATENT DOCUMENTS
DE 39 17128 11/1990
* cited by examiner

Primary Examiner — William C Joyce
(74) Attorney, Agent, or Firm — Lucas & Mercanti, LLP

(57) ABSTRACT

A cage for inclined ball bearings with adjacent ball pockets separated from each other by webs. Elastically-deformable retainer lugs extend from the webs with flanks facing opposing directions and facing each other.

8 Claims, 3 Drawing Sheets

CAGE FOR INCLINED BALL BEARING

FIELD OF THE INVENTION

The invention relates to a cage for inclined ball bearings having ball pockets which are adjacent to one another and are delimited from one another by webs, retaining lugs protruding from the webs.

BACKGROUND OF THE INVENTION

A cage of this type is described in U.S. Pat. No. 6,447,169 B2. Typical examples of materials which are used for the manufacture of cages of this type are polyamides which are reinforced with glass or with carbon fibers (for example, PA66/GF). In this case, the cage has two side rims which are connected to one another by webs. One of the side rims is arranged on one side of the cage above the pitch circle and another side rim is arranged below the pitch circle.

These retaining lugs are formed as a rule on one of the side rims or, as in the example under consideration according to U.S. Pat. No. 6,447,169 B2, on the webs and protrude in the radial direction out of the cage over the rim or over the side walls. The retaining lugs engage into a corresponding annular groove on one of the bearing rings of the inclined ball bearing. The cages are held, preassembled together with the balls and the corresponding bearing ring to form a structural unit, via the retaining lugs on the bearing ring. Retaining lugs of this type are also suitable for axial travel limitation of the cage in a bearing.

During assembly of the cage on/in the bearing ring, the retaining lugs are compressed or expanded elastically until the retaining lugs snap into a corresponding annular groove on the bearing ring. In the region, at which the highest bending moments are produced on the retaining lugs during this assembly, the retaining lugs have to be stable enough not to deform permanently or to break when being pushed onto the bearing ring. For this reason, the material cross section of the retaining lugs on cages according to the prior art increases with decreasing distance from the webs, as viewed from the free end of the retaining lugs. Retaining lugs which have relatively large cross sections with low dimensions are therefore inherently advantageous for the stability of the retaining lugs. The retaining lugs which are described in the prior art under consideration are therefore of comparatively small and compact configuration.

In contrast, large cross sections are disadvantageous during the assembly of the cages on/in the bearing ring, as the assembly forces for pushing them on, for example onto an inner ring, are high counter to the resistance during the expansion of the retaining lugs. Moreover, the retaining lugs are then not of sufficient elastic configuration and are easy to damage on account of the high assembly forces and despite the compact design.

The dimensions of the retaining lugs are subject to limits in the inclined ball bearing, as only a small amount of installation space is available between the bearing rings of the inclined ball bearing.

The molding tools for the manufacture of the cages are of relatively complicated configuration. The aim is to design the geometry of the retaining lugs as simple as possible. For this reason, for example the flanks (flank faces), which face in the circumferential direction, of each of the retaining lugs are oriented parallel to one another in cages according to the prior art, for reasons of manufacturing technology.

The cages are frequently picked up and moved by means of grippers during automated assembly of the cages. In the process, the retaining lugs are often auxiliary means, by which the cages are gripped using the grippers. Here, in turn, retaining lugs having a small action face with relatively small dimensions are disadvantageous for the grippers.

The above-mentioned requirements for the stability of the cages and their retaining lugs are contradicted by the requirement for low material usage during their manufacture. Material for the manufacture of the cage can be saved if the cage generally has small material cross sections and is therefore of thin-walled configuration. Moreover, the cross sections and, in particular, transitions, for example from the web to the rims, should be uniform for reasons of manufacturing technology.

The thin-walled configuration is subject to limitations as a result of the requirements for high operating strength of the cage. If the cross sections at rims or side walls are too small, it is to be feared that deformations of the retaining lugs are transmitted to the rims/side walls and the latter break or are deformed plastically. Furthermore, thin-walled plastic parts are extremely unstable after removal from the die and frequently lose their intended shape or geometry during subsequent cooling and during storage.

The above-mentioned and contradictory requirements make the optimum design of cages having retaining lugs difficult.

SUMMARY OF THE INVENTION

It is therefore the object of the invention to provide a cage which meets the above-mentioned and partially contradictory requirements of manufacturability, of inexpensive manufacture and of function in an optimum manner.

This object is achieved according to the subject matter of the characterizing part of claim 1. In one or both axial directions of the cage, the ball pockets are delimited in each case by a side wall and by a common rim or on both sides by a rim. The side walls and/or rims preferably have approximately uniform wall thicknesses. Each of the side walls or each of the rims connects two webs, which lie opposite one another, to one another on the circumferential side.

Retaining lugs, for example for axially securing the cage in an annular groove of an inner/outer ring of the inclined ball bearing, protrude from the webs in the direction of the outer ring or in the direction of the inner ring. The retaining lugs are each adjacent to further retaining lugs on the circumferential side.

The adjacent flanks of the retaining lugs which point toward one another are inclined toward one another in such a way that the flanks on one retaining lug and the flanks of the adjacent retaining lugs which face one another are inclined toward one another.

Each of the retaining lugs is separated on the circumferential side from a further retaining lug by a circumferential gap. The flanks of mutually adjacent retaining lugs, which point toward the circumferential gap, approach one another as viewed with increasing distance from the web and with decreasing distance from the rotational axis. The inner width of the circumferential gap is therefore reduced between the flanks which lie opposite one another at the gap, as viewed from the web in the direction of the free ends of the retaining lugs. Accordingly, the retaining lugs widen in the direction of their free end. At the same time, the height of the retaining lugs is preferably reduced as the width increases. The retaining lugs are therefore of stable design, especially in the area, in which the greatest bending moments occur during latching with the bearing ring; and in the direction of the free end increasingly elastic.

The retaining lugs are elastic, because they have small material cross sections in contrast to the compact design according to the prior art and are relatively long. The ratio of the smallest length of the retaining lugs (smallest spacing from the tip of the free end of the retaining lugs in the direction of the transition to the web which lies closest to this tip) to the greatest height may not be smaller than 2:1, but rather greater. On account of low assembly forces, elastically resilient retaining lugs make assembly of the cage on the bearing ring easier.

One embodiment of the invention provides for the flanks which face one another on the circumferential side to be described by straight edges which face the circumferential gap or by flat faces. The flanks are inclined by an angle with respect to an imaginary straight line which intersects the rotational axis perpendicularly and/or with respect to the plane which emanates from the rotational axis and is aligned with the rotational axis of the inclined ball bearing. The straight line lies in the plane. The flanks of mutually adjacent retaining lugs and the two flanks on the respective retaining lugs are preferably inclined at an acute angle of 20° with respect to the plane/straight line. Those flanks of the respective retaining lug which face one another at the circumferential gaps therefore enclose an angle of 40° between themselves.

According to one embodiment of the invention, the area of any arbitrary cross-sectional face of the retaining lug decreases in comparison with the area of further, individual cross-sectional faces which are spaced apart from one another over the entire length of the respective retaining lug, with increasing spacing of the respective cross-sectional face from the rotational axis. However, these areas can be predefined by different widths and heights from cross section to cross section. However, the aim is to keep the height of the retaining lugs as constant as possible from cross section to cross section as far as the transition of the retaining lug into the web, or to change it only slightly. The ratio of the smallest width of the retaining lugs to the greatest height is not smaller than 2.5:1 according to one embodiment of the invention.

The retaining lugs preferably emanate initially from the webs between the web and the rotational axis, and then point obliquely in the direction of the rotational axis. The retaining lugs therefore emanate from the base of the webs, that faces inward toward the rotational axis of the inclined ball bearing. The cross section of the webs is relatively large at this transition, with the result that the webs are rigid. The circumferential or tangential dimension of the webs is at least as large as the width of the retaining lugs in these circumferential or tangential directions. As a result, the material of the retaining lugs merges into the cage only at the web. Between the side walls and the retaining lugs, there is only a connection via the web. The web, which is relatively rigid at the transition, prevents deformations of the snapping lugs being transmitted, or barely being transmitted, to the adjacent side walls of the pockets during assembly of the cage on the bearing ring. Damage of the pocket as a result of permanent deformations or breakage as a result of extension or compression of the retaining lugs is avoided. Side walls, rims, etc. can be of thin-walled design from aspects of material economy.

The retaining lugs which widen tangentially or circumferentially toward the end afford sufficient action face for grippers during the machine assembly of the cages on the bearing ring.

As a result of the design of the retaining lugs and their transition into the side walls, the cage can be optimized during manufacture with regard to material usage. The cage optionally has one or two side rims. A cage is preferred, the side walls of which, starting from the webs, are arched at least in the axial direction and are without a rim. Here, the side walls protrude over the webs in the axial direction. The axially protruding cusp of the arches protrudes axially furthest out of the cage in the axial direction.

On at least one end side between the arched side walls of the pockets, the cage is provided in each case with a circumferentially or tangentially oriented rib between individual pockets. Less material is used for the manufacture of the cage than for a cage having two side rims, and the functional strength is ensured via the composite unit of ribs, retaining lugs and side walls.

A rim preferably delimits the pockets on the opposite side to the side of the cage, on which the side walls are formed. As one of the side rims usually extends radially below the pitch circle of the balls and one of the side rims runs radially above the pitch circle of the balls in cages for inclined ball bearings of the generic type, the result for the above-mentioned cage is that the smallest radial spacing of the side rim from the rotational axis of the cage is greater than the greatest radial spacing of the side walls from the rotational axis.

Further refinements of the invention are described in the section "Detailed Description of the Drawings".

BRIEF DESCRIPTION OF THE DRAWINGS

In the following text, the invention will be described in greater detail using an exemplary embodiment. In the drawings, in detail.

DETAILED DESCRIPTION OF THE DRAWINGS

Figure 1:
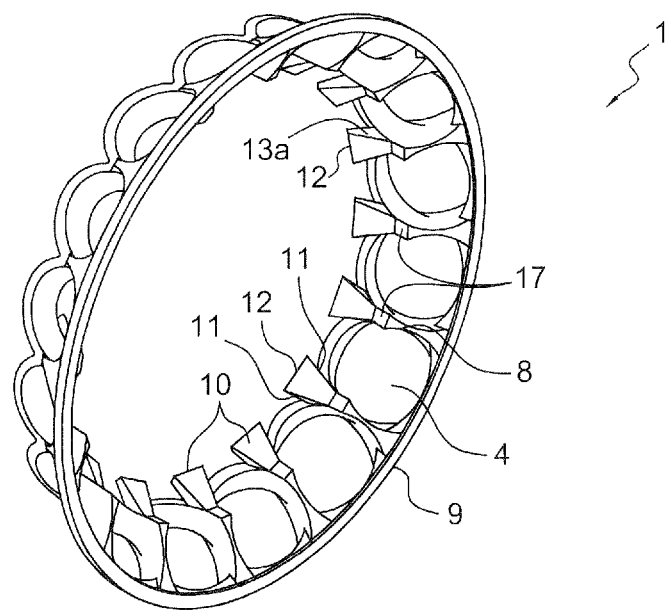
FIG. 1 shows the overall view of an exemplary embodiment of a cage according to the invention.
Figure 2:
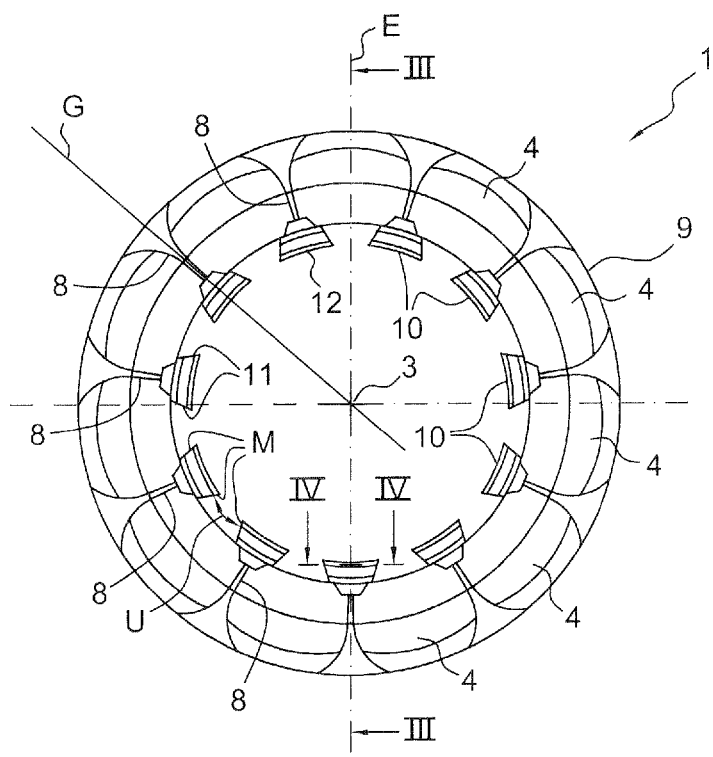
FIG. 2 shows the front view of the cage from FIG. 1 in the direction of the arrow.
Figure 3:
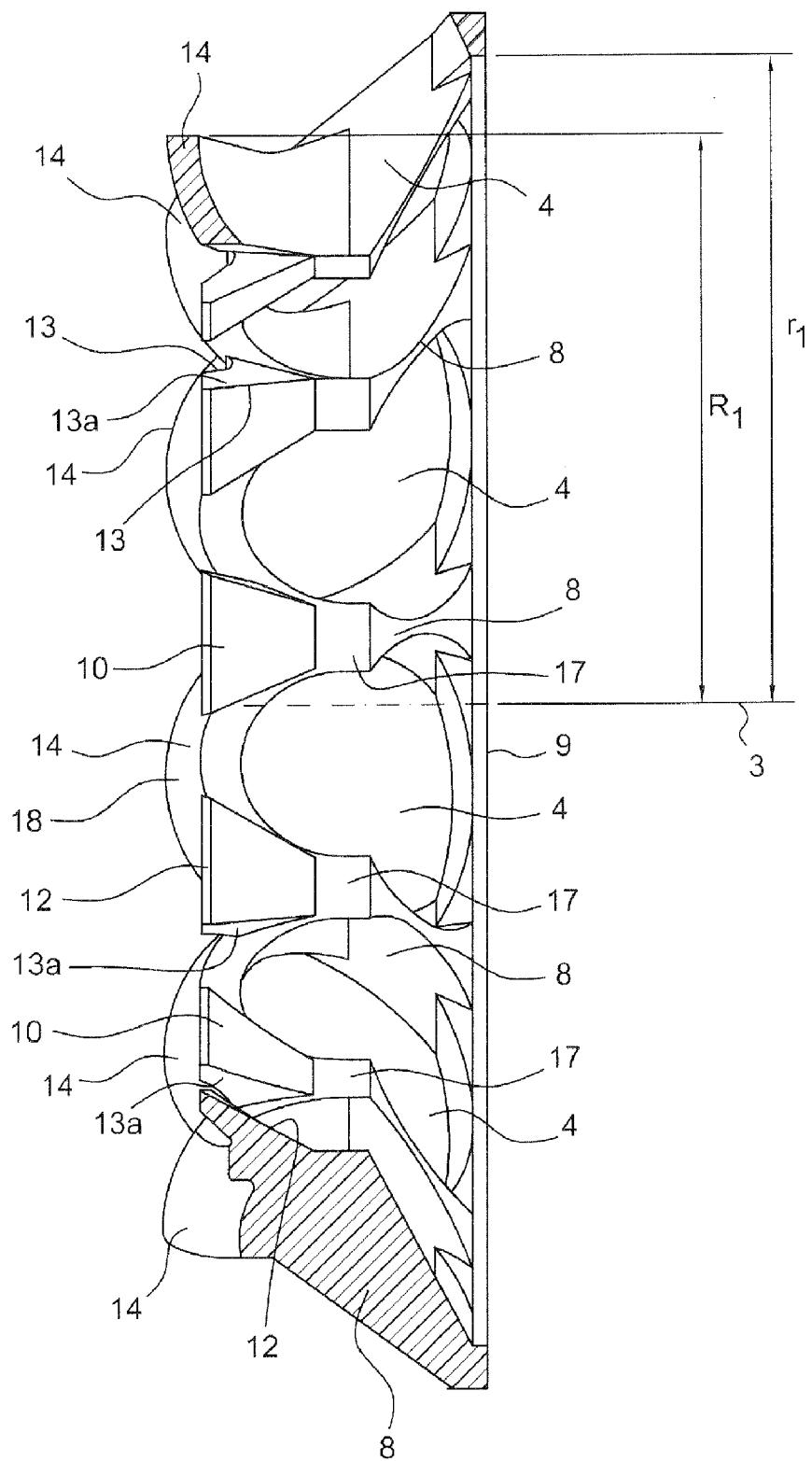
FIG. 3 shows a longitudinal section through the cage along the line III-III according to FIG. 2.
Figure 5:
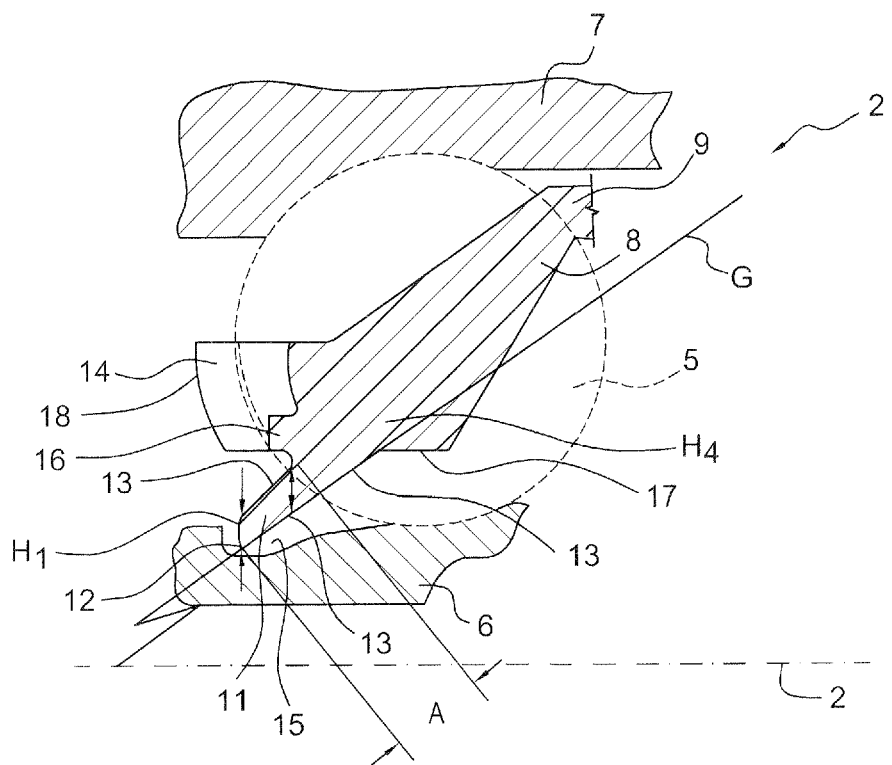
FIG. 5 shows the detail Z from FIG. 3 in a much enlarged illustration, the cage being installed in an inclined ball bearing.

FIGS. 1 and 2 show a cage 1 for an inclined ball bearing 2. A detail of the inclined ball bearing is shown in sectional form in FIG. 5. The cage 1 has ball pockets 4 on the circumferential side which are adjacent to one another about its rotational axis 3 with a uniform pitch. A ball 5 is guided in each individual ball pocket 4. FIG. 5 shows the cage 1 with balls 5, which cage 1 is arranged radially between an inner ring 6 and an outer ring 7. The ball pockets 4 are delimited by webs 8 which extend transversely with respect to the circumferential direction. As can be seen, in particular, from FIGS. 1, 3 and FIG. 5, the webs 8 extend initially in an inclined manner in the direction of the rotational axis 3, starting from a side rim 9, and then extend in the axial direction.

Figure 4:
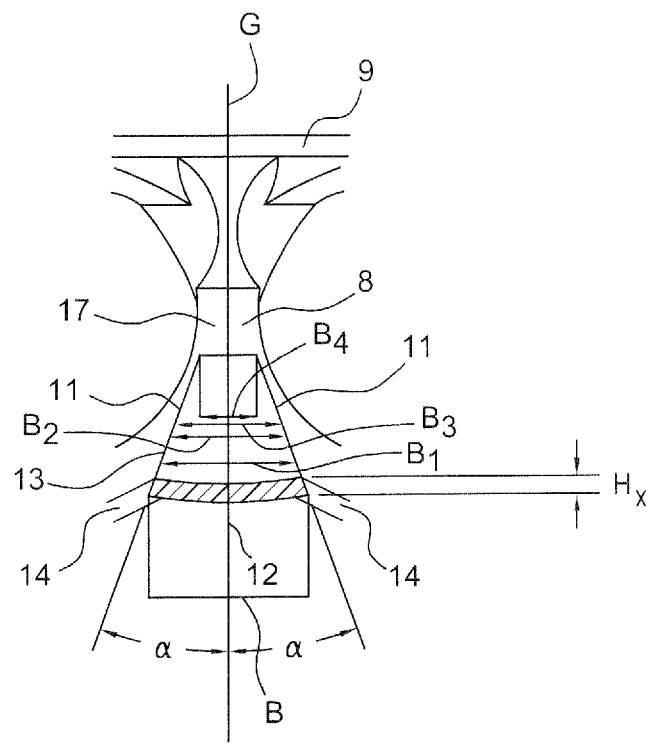
FIG. 4 shows a partial view of the cage according to FIG. 1, in a longitudinal section along the line IV-IV according to FIG. 2.

Retaining lugs 10 protrude from the webs 8. The retaining lugs 10 are of elastically resilient design and are provided with flanks 11 which point in opposite directions on the circumferential side and are inclined toward one another. The retaining lugs 10 which extend in an inclined manner with respect to the rotational axis 3 widen tangentially or on the circumferential side in the direction of their free end 12, as viewed from the web 8. The radial height $H$-$H_4$ decreases at the same time as the width $B$-$B_4$ increases (FIGS. 4 and 5). At the same time, the circumferential spacings U (FIG. 2) from flanks 11 which lie opposite one another of mutually adjacent retaining lugs 10 decrease in the direction of their free ends 12. Hence, the circumferential spacing of the flanks 11 which face away from one another of each retaining lug 10 increases with decreasing distance from the rotational axis 3. The ratio of A to B is from 1:2.5 to 1:3 (A=length of the shortest body edges 13, at which the retaining lugs 10 merge into the face section 17 of the web 8; B=greatest tangential width of the free ends).

Each of the flanks 11 is described by a long and a short body edge 13 which extend in each case in a straight line. In this case, the body edges 13 delimit faces 13a. The body edges 13 and therefore the faces 13a are inclined by an acute angle $\alpha$ with respect to an imaginary plane E that is at the same time emanating from, as well as aliged with the rotational axis 3 and with respect to the imaginary straight line G which lies in the plane E and at the same time intersects the rotational axis 3.

The webs 8 have face sections 17 which face the rotational axis 3. One of the retaining lugs 10 protrudes from each of the face sections 17. The retaining lugs 10 protrude the furthest in the axial direction at most as much as the side walls 13 protrude the furthest in the axial direction, starting from the web 8. The retaining lugs 10 engage radially into an annular groove 15 on the inner ring 6. The cage 1 is secured axially with play on the inner ring by means of the retaining lugs 10.

The ball pockets 4 are delimited by one side wall 14 each having an approximately uniform wall thickness. The side walls 14 are arched at least in the axial direction, starting from the webs 8. In each case one rib 16 over a retaining lug 10 emerges in the axial direction from in each case one of the webs 8 and connects two of the side walls 14 of ball pockets 4 which follow one another on the circumferential side to one another. At the same time, each of the ribs 16 protrudes from the web 8 in the axial direction at most as far as the side walls 14 protrude furthest in the axial direction at the cusp 18 of their curvature, starting from the web 8, but not further.

The side rim 9 delimits the ball pockets 4 across from the side walls in an opposite direction to the axial direction. The smallest radial spacing $r_1$ of the side rim 9 from the rotational axis 3 of the cage 1 is greater than the greatest radial spacing $R_1$ of the side walls 14 from the rotational axis 3.

LIST OF DESIGNATIONS

1 Cage
2 Inclined ball bearing
3 Rotational axis
4 Ball pocket
5 Ball
6 Inner ring
7 Outer ring
8 Web
9 Side rim
10 Retaining lug
11 Flank
12 End
13 Body edge
13a Face
14 Side wall
15 Annular groove
16 Rib
17 Face section
18 Cusp

The invention claimed is:

1. A cage for inclined ball bearings, comprising:
a side wall and a side rim spaced axially apart and interconnected by webs defining ball pockets,
the side wall having an approximately uniform wall thickness in an axial direction along an entire circumferential length of the sidewall with an arched portion of the side wall defining each of the ball pockets and being arched in the axial direction, and
the side rim having a uniform wall thickness in the axial direction along an entire circumferential length of the side rim; and
elastically resilient retaining lugs axially protruding at a linearly inclined angle from the webs that widen toward a unitary end and are circumferentially adjacent to each other, each of the retaining lugs being separated circumferentially from a further retaining lug by a gap,
wherein the retaining lugs have flanks, which extend linearly, pointing in opposite directions circumferentially and which are linearly inclined toward one another.

2. The cage as claimed in claim 1, wherein each of the flanks has at least one straight body edge, the body edge being inclined by an angle with respect to an imaginary plane, the plane emanating from a rotational axis of the cage and being aligned with the rotational axis in the axial direction of the cage.

3. The cage as claimed in claim 2, wherein each of the flanks is inclined with respect to a straight line which is imaginary and intersects the rotational axis.

4. The cage as claimed in claim 2, wherein a circumferential spacing of two flanks which face away from one another on one of the retaining lugs increases with decreasing radial distance from the rotational axis.

5. The cage as claimed in claim 2, wherein the flanks are flat faces, the faces being inclined at an acute angle with respect to one another.

6. The cage as claimed in claim 1, wherein the retaining lugs protrude from face sections on the webs, the face sections facing a rotational axis of the cage.

7. The cage as claimed in claim 1, wherein the retaining lugs protrude furthest in the axial direction at most as much as the side walls protrude the furthest in the axial direction, starting from the webs.

8. The cage as claimed in claim 1, wherein a smallest radial spacing of the side rim from a rotational axis of the cage is greater than a greatest radial spacing of the side walls from the rotational axis.

* * * * *